United States Patent [19]

Miller

[11] 4,109,194

[45] Aug. 22, 1978

[54] DIGITAL FEEDBACK CONTROL UTILIZING ACCUMULATED REFERENCE COUNT TO REGULATE VOLTAGE OUTPUT OF SWITCHING REGULATOR

[75] Inventor: Norman Richards Miller, Summit, N.J.

[73] Assignee: Bell Telephone Laboratories, Incorporated, Murray Hill, N.J.

[21] Appl. No.: 805,018

[22] Filed: Jun. 9, 1977

[51] Int. Cl.[2] .............................................. G05F 1/56
[52] U.S. Cl. .................................... 323/17; 323/22 T; 323/DIG. 1
[58] Field of Search ...................... 323/17, 22 T, 43.5, 323/45, DIG. 1; 363/76, 77, 124

[56] References Cited

U.S. PATENT DOCUMENTS

| 3,818,321 | 6/1974 | Willner et al. | 323/43.5 S |
| 3,952,240 | 4/1976 | Ruumpol | 323/45 |

OTHER PUBLICATIONS

DeBrita et al., "Integrated Binary Power Controller," IBM TDB vol. 17, No. 8, Jan. 1975, pp. 2227–2229, 323-DIG. 1.
Calvo et al., "Analog-Digital Transistor Switching Regulator Controller," IBM TDB vol. 17, No. 8, Feb. 1975, pp. 2666–2667, 323-DIG. 1.

Primary Examiner—A. D. Pellinen
Attorney, Agent, or Firm—Alfred G. Steinmetz

[57] ABSTRACT

A digital feedback control for a switching regulator utilizes interrelated digital counting circuits to provide a combined proportional, integral and differential feedback. By generating a simultaneous interrelated feedback signal, the response time of the feedback control is improved and a significant reduction in circuit elements is permitted.

15 Claims, 8 Drawing Figures

DIGITAL FEEDBACK CONTROL UTILIZING ACCUMULATED REFERENCE COUNT TO REGULATE VOLTAGE OUTPUT OF SWITCHING REGULATOR

BACKGROUND OF THE INVENTION

1. Field of the Invention

This invention relates to power equipment and, more specifically, to pulse width modulated switching regulators. It is particularly concerned with a switching voltage regulator having digital feedback control utilizing frequency averaging techniques.

2. Prior Art

The conventional switching-type voltage regulator utilizes analog-type signal circuitry. The conventional switching regulator generally includes a switch, a switching drive, and a filter circuit as its main components. The switch is operated by the switching drive to periodically chop an applied DC input voltage. The chopped voltage is applied to the filter which derives therefrom an average DC voltage.

The switch is usually a transistor or SCR device which is operated in a fully conducting state, and an alternately nonconducting state. The drive circuit for the switch is generally coupled with a feedback circuit to regulate the output voltage. In the pulse width modulated type of switching regulator the pulse duty cycle is varied as a function of a line or load signal magnitude to compensate for changes therein. In most instances a regulated output voltage is compared with a reference voltage and the duty cycle of the switching device is modified to maintain the output voltage at a desired regulated value.

Analog feedback circuitry, while simple to implement, is difficult to control with respect to signal variations due to environmental factors. Such factors include the ambient temperature in which the circuit operates, the age of the circuitry, and other characteristic variations in the individual components of the circuit. Various compensating schemes have been devised to combat these disadvantages environmental factors. Such schemes include component compensation circuits which add to the complexity of the circuitry. Other schemes requires a careful coordinated selection of circuit components whose changes in response to environmental factors tend to cancel each other.

Recent switching regulator designs are beginning to utilize digital components in the resulation circuitry. An example of a digital feedback scheme differing from the conventional analog scheme is disclosed in U.S. Pat. No. 3,445,754, issued to S. L. Broadhead on May 20, 1969. In this switching type voltage regulator the conduction through a switching device is pulse width modulated in response to the comparison of the signal of a reference oscillator and the signal of a voltage controlled oscillator responsive to the regulated output voltage. The input DC voltage is coupled to a switching device. The conductivity of the switching device is controlled by a flip-flop circuit whose RS inputs are triggered respectively by the reference oscillator output and the voltage controlled oscillator output. The phase relation between the voltage controlled oscillator and the reference oscillator controls the duration of the DC signal voltage transmitted by the switching device to the output of the voltage regulator. This pulse width modulation arrangement controls the magnitude of the output voltage.

The Broadhead feedback control circuit is a phase-locked loop oscillator control for a voltage regulator which includes a voltage controlled oscillator. This control uses the signal phase difference between the voltage controlled oscillator output and the reference oscillator output to control the output of the regulator. While the form of the reference signal is different from the form of the output signal, this is still an analog signal approach and includes many of the same disadvantages due to environmental factors.

Another example of a switching regulator design utilizing digital components in the regulation circuitry is disclosed in U.S. Pat. No. 3,970,919, issued to D. T. Butcher on July 20, 1976. Butcher discloses a switching type voltage regulator. Conduction through a switching device is controlled in response to an analog comparison of a reference voltage and the output voltage to be regulated. Comparison is periodically performed in response to a strobe pulse derived from a series of clock pulses. At each comparison an up-down counter is either incremented or decremented depending upon the relative magnitudes of the reference voltage and the output voltage. The resultant count is preset in a down counter and the switch device is biased conducting. The down counter is decremented by a multiple of the strobe pulse rate and the attainment of a zero count is utilized to terminate conduction through the switching device.

The regulator control disclosed in the Butcher patent still relies upon an analog signal comparison to regulate the output voltage and hence is still susceptible to many of the disadvantages of analog regulation circuits.

A digital feedback regulator control is disclosed in the pending application V. B. Boros, Ser. No. 733,058, filed Oct. 18, 1976, and assigned to the same assignee as this application. The regulator circuit disclosed in Boros utilizes fully digital regulation techniques. In particular, Boros discloses a basic digital feedback control for a switching type voltage regulator which comprises a voltage controlled oscillator connected to the output voltage being regulated and operating in response thereto as a voltage magnitude-to-frequency converter. The frequency output of the voltage controlled oscillator is applied to a counting circuit which is periodically reset in response to a clock source. Conduction in the resulator's switching device is periodically initiated in response to the clock source. The counter periodically counts the cycles of the signal frequency output of the voltage controlled oscillator. The accumulating periodic count is continuously compared with a preset reference count by a comparator. When the periodic count responsive to the voltage controlled oscillator frequency attains a certain numerical value equaling the reference count, the conducting interval of the switching regulator's switching device is terminated. The duration of the conducting interval determines the regulated output voltage of the regulator.

Various control functions are added to the basic proportional digital feedback circuit disclosed by Boros to provide various additional control functions. Basically the stability of the regulated output signal is improved by the addition of a count modifier which may comprise a register or an up-down counter in the digital feedback loop. This count modifier or up-down counter operates to dynamically alter the reference number used to control the conduction interval of the switching device of the regulator. Sequentially operative derivative and integral feedback techniques operate in conjunction with the up-down counter to supplement the response of the basic proportional digital feedback control. These techniques are utilized to improve the static and dynamic response of the digital feedback loop.

The regulator feedback circuit disclosed by Boros is a digital approach and advantageously eliminates many of the enumerated drawbacks of previous conventional analog feedback control circuits such as temperature changes, aging, supply voltage changes, changes in the reference signal, and other similar factors. The implementation of the Boros regulator circuit includes numerous component parts. The operation of the digital regulator process utilizes a separate control signal sequencing control. Depending upon the speed of the operation of the component assemblies, feedback signals may not be immediately operative.

SUMMARY OF THE INVENTION

It is therefore an object of the present invention to simplify the implementation of a digital feedback regulator circuit by interrelating independent functions to reduce the number of separate circuit elements required.

It is another object of the invention to calculate and utilize all feedback functions simultaneously to permit a faster and improved response to transient conditions in the regulator.

It is yet another object of the invention to permit the use of digital feedback regulation with high frequency switching regulators.

Therefore, in accordance with the foregoing objects, the invention is embodied in a digital feedback control unit operative to regulate the voltage output of a switching regulator. The magnitude of the output voltage is monitored and converted into a signal frequency. Actual numerical values representative of the actual output voltage are generated each cycle. Successive actual numerical values are subtracted to generate a differential feedback value. A numerical reference value is preestablished to represent a desired regulated output voltage. The reference value is decremented by the signal frequency output for the duration required to attain the actual count in each cycle in order to generate a proportional feedback signal. The count representative of the proportional feedback is accumulated during successive cycles to generate an integral feedback signal. The several counts representative of the differential, proportional, and integral feedback signals are summed and are decremented by the signal frequency responsive to the output voltage magnitude during each cycle to establish the duty cycle of the switching device of the switching regulator.

DETAILED DESCRIPTION

Figure 1:
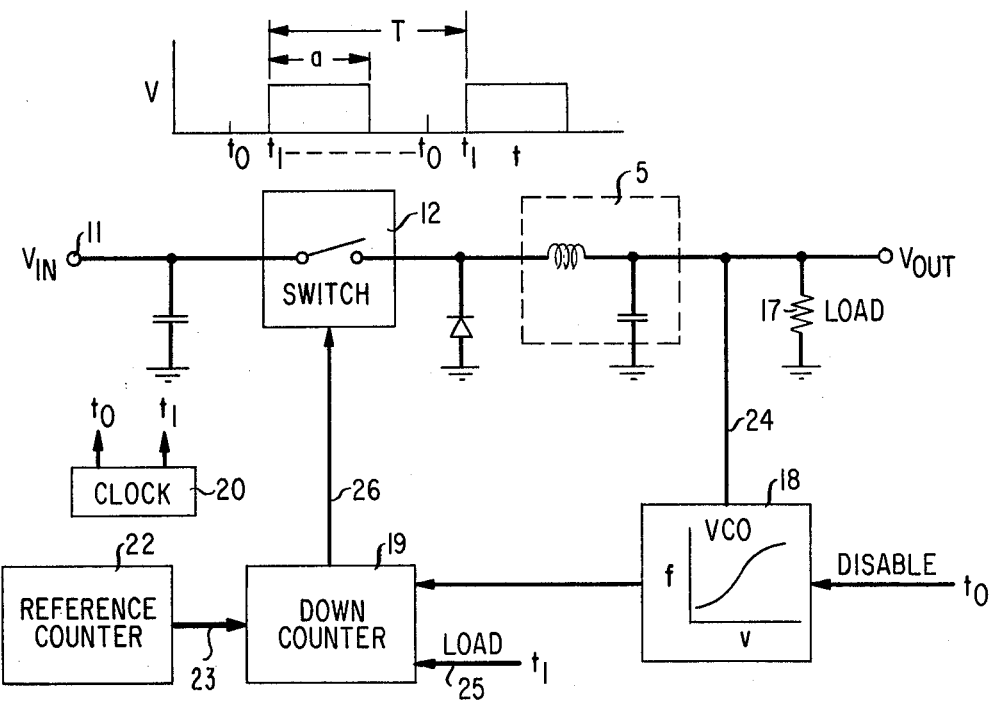
FIG. 1 is a partial schematic and block diagram of a basic digital feedback control for a switching regulator.

The switching regulator disclosed in FIG. 1 is a pulse width modulated switching regulator which incorporates digital circuitry and a voltage-to-frequency converter or an amplitude-to-frequency modulation circuit in a digital regulation feedback control as opposed to the analog circuits of a conventional switching regulator. The analog reference signal of the conventional switching regulator is replaced herein by a digital reference quantity which has the advantageous property of being invariant to the aforedescribed environmental factors.

Figure 5:
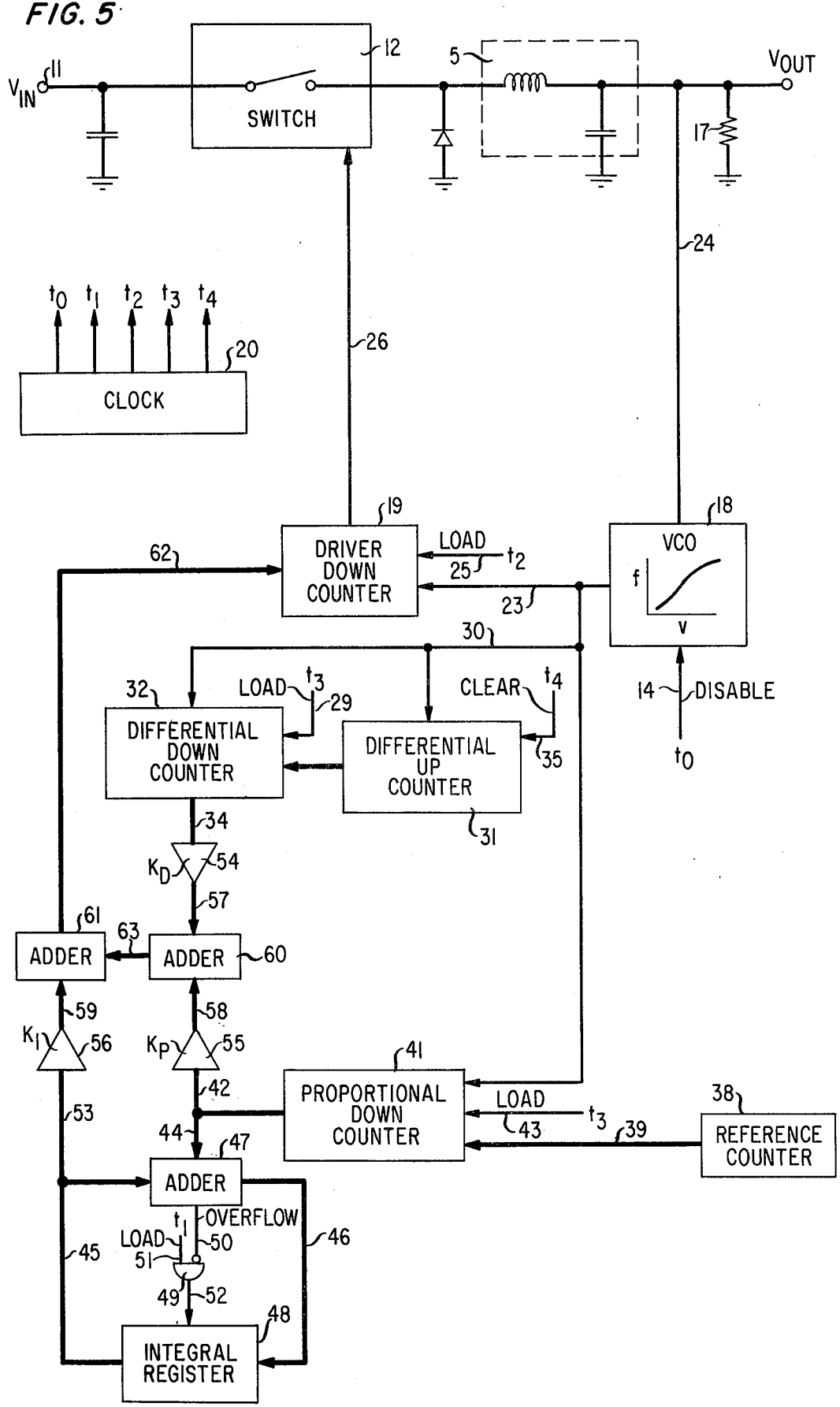
FIG. 5 is a partial schematic and block diagram of a digital feedback control for a switching regulator including proportional, integral, and derivative feedback control.

A DC voltage source applied to input terminal 11 is coupled to a load impedance 17 through a switch 12 and a low-pass filter 5. A clock, or periodic timing circuit, 20 is utilized to establish a modulation period. The clock 20 periodically generates a series of sequential timing pulses to control the various periodic functions of the switching regulator and the digital feedback. A clock circuit to generate these timing pulses for the complete digital control circuit disclosed in FIG. 5 is disclosed in detail in FIG. 7. It is not believed necessary to disclose such a timing circuit for the circuit of FIG. 1.

The output designated $t_0$ is coupled to periodically disable the voltage controlled oscillator 18 as described below to allow a time interval to compute feedback functions. The pulse signal $t_0$ has a sufficient time duration to permit the other timing signals to perform the loading function in the feedback circuitry before the voltage controlled oscillator 18 resumes operation. The output designated $t_1$ is utilized to load a reference count into down counter 19 from the reference count source 22. The termination of timing signal $t_0$ reenables the voltage controlled oscillator 18 which applies its signal frequency output to decrement down counter 19 as described below. The interval of the occurrence of the timing signals during which control functions are computed is designated herein as the quiet interval for purposes of exposition.

The state of the output signal of down counter 19 on lead 26 controls the conductivity of the switch 12. If the signal is in a high state, switch 12 is closed and conducting. If the signal is in a low state, switch 12 is open and nonconducting. As soon as the reference count is loaded into down counter 19, its output signal becomes high and initiates the modulation period T of the switching regulator as shown in the voltage waveform shown adjacent to switch 12 in FIG. 1. This switch 12 is subsequently disabled, or opened and held off, for the remainder of the modulation period in response to the digital feedback control comprising a voltage controlled oscillator 18, a down counter 19, and a reference count register 22. The switch 12 is disabled when the reference count loaded in down counter 19 is completely decremented by the voltage controlled oscillator 18 and the output signal of down counter 19 goes into a low state.

The voltage regulator operates so that the conduction interval of the switch 12 shown as interval $a$ in the waveform adjacent to switch 12 varies inversely with the magnitude of the output voltage. The digital feedback circuit controls the conduction interval $a$ of the switch 12 to precisely regulate the output voltage. If the output voltage decreases, the conduction interval $a$ of switch 12 is increased. If the output voltage increases, the conduction interval $a$ of switch 12 is decreased.

The voltage controlled oscillator 18 is coupled, via lead 24, to monitor the output voltage of the regulator. The output of the voltage controlled oscillator 18 is a signal whose frequency is proportional to the output voltage magnitude of the regulator. If the output voltage decreases, the output frequency of the voltage controlled oscillator 18 decreases. Conversely, if the output voltage increases, the output frequency of the voltage controlled oscillator 18 also increases. The frequency and voltage characteristics of a voltage controlled oscillator suitable for use herein are shown by the transfer curve shown within the block representing the voltage controlled oscillator 18. The circuit used herein is designed so that it will normally operate on the linear portion of the transfer curve shown therein.

At the beginning of each modulation period T, the down counter 19 is preset to a positive reference count in response to a loading signal $t_1$ applied thereto, via lead 25, and supplied by the timing circuit 20. The output of the counter 19 on lead 26 now assumes a high state. The switch 12 is closed and begins conducting.

The preset reference count is transmitted in parallel via the parallel leads 23 to down counter 19 by the reference count source 22. The reference count stored in the reference count source 22 is preselected to be representative of and to maintain the desired regulated output of the regulator. The frequency output of the voltage controlled oscillator 18 is applied to the down counter 19 and the frequency pulses are utilized to decrement the positive count preset therein. The output of the down counter 19 on lead 26 changes to a low state when the count contained therein is decremented to a negative one count just beyond zero.

When the count in the counter 19 is decremented to a negative one count just beyond zero, its output assumes a low state on lead 26, which biases the switch 12 nonconducting. The time required by the counter 19 to decrement the preloaded reference count to a negative one count beyond zero varies inversely with the frequency of the signal output of the voltage controlled oscillator 18. If the voltage controlled oscillator frequency decreases because the output voltage decreases below its desired value, the time required to decrement the preset positive count to a negative one count, i.e., the time at which the switch opens, increases so as to maintain the average output voltage on the regulator at a substantially constant value. The corrective feedback signals supplied by the digital feedback control are a function of the error of the output voltage from its desired regulated value.

The components used in the circuit described above are standard switching regulator and digital circuits well known to those skilled in the art and it is not believed necessary to describe them herein in detail.

The basic feedback circuit shown in FIG. 1 operates as a proportional feedback circuit arrangement. The feedback gain in this particular arrangement is controlled by the slope of the voltage-to-frequency transfer curve of the voltage controlled oscillator 18. It is readily apparent that by increasing the gain the output voltage error from its ideal regulated value can be significantly reduced. This additional gain proportional to the error voltage may readily be obtained in accord with the invention by a separate proportional feedback circuit.

The basic feedback control circuit disclosed in FIG. 1, while accurate with steady input voltages, responds to a step change in the input voltage by introducing oscillations in the regulated output signal. A derivative feedback signal may be generated and utilized to counteract these oscillatory tendencies. This derivative signal is proportional to the rate of change of the output voltage. The added derivative feedback signal improves the dynamic response of the digital feedback control by dampening the oscillatory response of the output voltage of the regulator to step changes in the input voltage. Derivative feedback signals are generated digitally by computing the average of the difference between successive counts representing the output voltage by the voltage controlled oscillator during successive periods.

A step change in the input voltage also introduces a static error into the regulated output voltage. This error may be integrated and the resultant signal utilized to counter the static error. The digital integration is performed by a summation of successive error value counts generated by the proportional feedback circuit. Signals or counts generated by the aforementioned derivative, integral, and proportional feedback circuits are combined to improve the dynamic and static performance of the regulated switching regulator.

Proper performance of the digital feedback control of the switching regulator may require that the gain of the various feedback functions described above be adjusted to values other than unity. Gain multiplication in each of the feedback circuits may be easily obtained therein by a simple digital shifting operation in each individual digital feedback circuit. This shifting may be done by a register included therein or may be done by simple wiring connections. Through these techniques any desired gain of $2^n$ magnitude may be obtained which is invariant with respect to environmental factors. The value $n$ may comprise any positive or negative integer.

Figure 2:
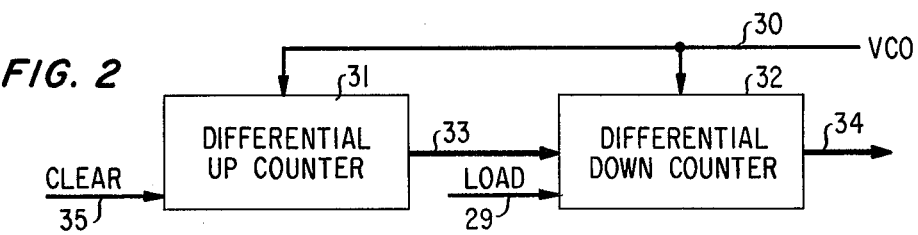
FIG. 2 is a block diagram of a digital circuit to compute a value proportional to the derivative of the output voltage of the regulator.
Figure 3:
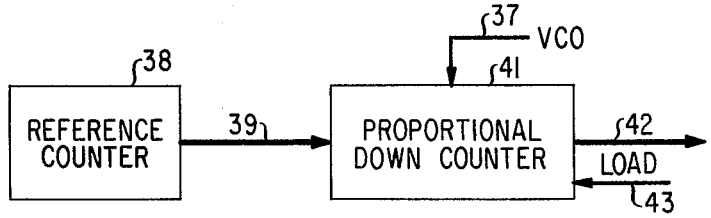
FIG. 3 is a block diagram of a digital circuit to compute a value proportional to the error of the output voltage of the regulator.
Figure 4:
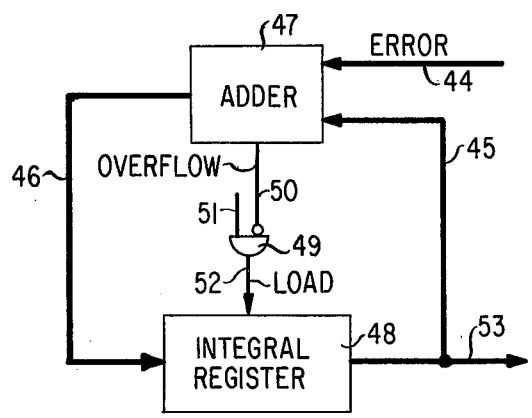
FIG. 4 is a block diagram of a digital circuit to compute a value proportional to the integral of the error of the output voltage of the regulator.

FIGS. 2, 3, and 4 each show a specific implementation of digital circuits to generate differential, proportional and integral feedback signals, respectively. While these circuits are shown individually for the purposes of explanation, it is to be understood that they are designed to act in an interrelated manner with each other as disclosed with reference to FIG. 5.

FIG. 2 shows in block diagram form digital circuitry suitable to calculate the differential of a regulated output voltage of the switching regulator. This circuit operates to differentiate the output voltage by subtracting successive numerical counts representative of the output voltage at successive intervals.

At the beginning of any particular switching cycle the differential up counter 31 has stored within it a count representative of the output voltage of a previous switching cycle. A timing signal applied to lead 29 during the quiet interval when the voltage control oscillator is disabled is applied to the differential down counter 32 to load therein the count currently stored in the differential up counter 31. A subsequent timing signal during this quiet interval is applied, via lead 35, to clear the presently stored count from the differential up counter 31. At the termination of the quiet interval, the voltage controlled oscillator is reactivated and generates a signal whose frequency is proportional to the output voltage of the switching regulator. This signal frequency is applied via lead 30 to both the differential up counter 31 and the differential down counter 32. This signal decrements the stored count in the differential down counter 32 and at the end of the switching interval the down counter includes a count which is the difference between the current up count and the previous up count which was loaded by the differential up counter 31 into the differential down counter 32. This difference count signal is a close approximation of a derivative of the output voltage of the switching regulator. This count is applied to lead 34 wherein it is utilized as described below to damp sudden changes in the output voltage. A present up count is also stored in the differential up counter 31 where it is representative of the present output voltage magnitude and will be used in the next subsequent switching interval as the basis for the calculation of an approximate derivative of the output voltage.

FIG. 3 discloses in block diagram form a proportional feedback circuit to calculate a feedback signal or count proportional to the error in the output voltage from its desired regulated value. As described above, the basic feedback circuit disclosed in FIG. 1 is a proportional feedback circuit. However, the purpose of this feedback circuit is to add additional closed loop gain proportional to the error voltage without the necessity of modifying the transfer characteristics of the voltage controlled oscillator. This proportional gain is determined by calculating the difference between a preestablished reference count and a count representative of the actual output voltage of the regulator. The reference count is a count which is representative of the desired regulated output voltage. This reference count is supplied to the proportional feedback circuit by the reference count register 38 which has stored therein the count proportional to the desired regulated output voltage. This reference count is loaded into the proportional down counter 41 during the quiet interval of each cycle of operation of the regulator. This loading occurs in response to a timing signal applied to lead 43. When the voltage controlled oscillator is reenabled at the end of the quiet interval, its output is applied via lead 37 to the proportional down counter 41 where it decrements the reference count stored therein. At the end of the conduction interval of the switching regulator, the proportional down counter 41 contains a count representative of the error voltage. This error voltage count is applied to output lead 42 and is utilized as described below to reduce the static error of the output voltage.

FIG. 4 discloses in block diagram form an integral feedback whose purpose is to further reduce the static error of the output voltage. While this may also be accomplished by increasing the gain of the proportional feedback circuit, it cold conceivably introduce instabilities into the feedback circuit. The integral feedback circuit operates to reduce the output voltage error by generating a feedback count proportional to the integral of the error voltage.

An integral feedback count is generated by accumulating successive error counts as they occur during successive cycles as generated by the proportional feedback circuit described herein above with reference to FIG. 3. This error voltage count output of the proportional feedback circuit is applied at the end of each cycle to a summing or adder circuit 47. It is summed therein with a previous error count stored in the integral register 48 which is applied, via lead 45, to the summing circuit 47. The result of this summing function is applied, via lead 46, to the integral register where it replaces the previous stored error count.

The transfer of count number in the integral register 48 is accomplished in response to a timing signal applied to lead 51 during the quiet interval of the switching cycle. The signal is applied via lead 51 through normally enabled AND gate 49 and lead 52 to effect a loading into the integral register of the output of the adder 47.

An overflow input is connected to an inverting input of the AND gate 49. This overflow input monitors the count output of the adder 47 and is designed to protect against the possibility of an overload condition in the integral register 48. Should the summed output of the adder 47 be an integer in excess of the capability of storage of the integral register 48, the number will have a polarity or sign the reverse of its normal output. This reverse sign is applied via lead 50 to the inverting input of AND gate 49 and blocks the application of the timing signal on lead 51 to the integral register 48 by disabling AND gate 49.

The output of the integral register 48 is applied, via lead 53, to be utilized in reducing the static error of the output voltage as is described herein below.

The three feedback circuits disclosed above are combined as described below in an interrelated fashion to produce the desired proportional integrative and derivative feedback characteristics to achieve the desired regulated output.

A block and schematic drawing of a switching regulator having digital feedback control in accordance with the principles of the invention is shown in FIG. 5. The reference numerals used to designate components are the same as the reference numerals used in the previous figures where they identify identical components. The regulator and feedback control as shown in FIG. 5 combine into one unique circuit arrangement the various control functions which were shown and explained with reference to FIGS. 1 through 4 hereinabove. As described hereinabove, particularly with reference to FIG. 1, a reference count was preselected and decremented by the output of a voltage controlled oscillator responsive to the output voltage magnitude of the regulator. The reference count selected determined the magnitude of the regulated output voltage by controlling the pulse duration transmitted by the switching device of the regulator.

The control circuit described with reference to FIG. 5 is different from a mere summation of the various control functions described above. For example, the reference count source 22 utilized in FIG. 1 to control the duty cycle has been eliminated from the basic feedback loop. The principles of the feedback circuit embodying the invention will be readily apparent by reading the following description of the switching regulator and its feedback control as shown in FIG. 5. Voltage waveforms used in explaining its operation are shown in FIG. 6.

The switching regulator in FIG. 5 accepts a DC input voltage at DC input terminal 11 and transmits a pulse modulated version thereof via a switching device 12 and filter circuit 5 to an output load 17 to be energized. The operation of the digital feedback control circuit is controlled in response to a timing circuit 20 which generates timing signals to control the loading and clearing of counters and registers contained within the feedback control circuit. This timing circuit 20 is described hereinbelow in detail with reference to FIG. 7. The timing circuit 20 generates a first timing signal $t_0$ which is utilized to disable the voltage controlled oscillator 18 for the duration of the quiet interval which was described hereinabove. The timing signals $t_1$, $t_2$, $t_3$, and $t_4$ occur sequentially and are utilized during the quiet interval to control the loading, clearing, and transfer of stored counts within the feedback circuitry.

The output voltage of the regulator is coupled via lead 24 to an input of the voltage controlled oscillator 18. The voltage controlled oscillator 18 has a substantially linear voltage-to-frequency transfer characteristic. The frequency output of the voltage controlled oscillator 18 is proportional to the magnitude of the output voltage of the regulator. The timing signal $t_0$, which is shown by waveform R in FIG. 6, is applied to input lead 14 for the purpose of disabling the voltage controlled oscillator 18 to permit the functioning of the digital feedback control circuitry. The subsequent timing signals $t_1$, $t_2$, $t_3$, and $t_4$ are generated by the timing circuit 20 during the quiet interval established by $t_0$ and are shown by waveform S in FIG. 6.

Figure 6:
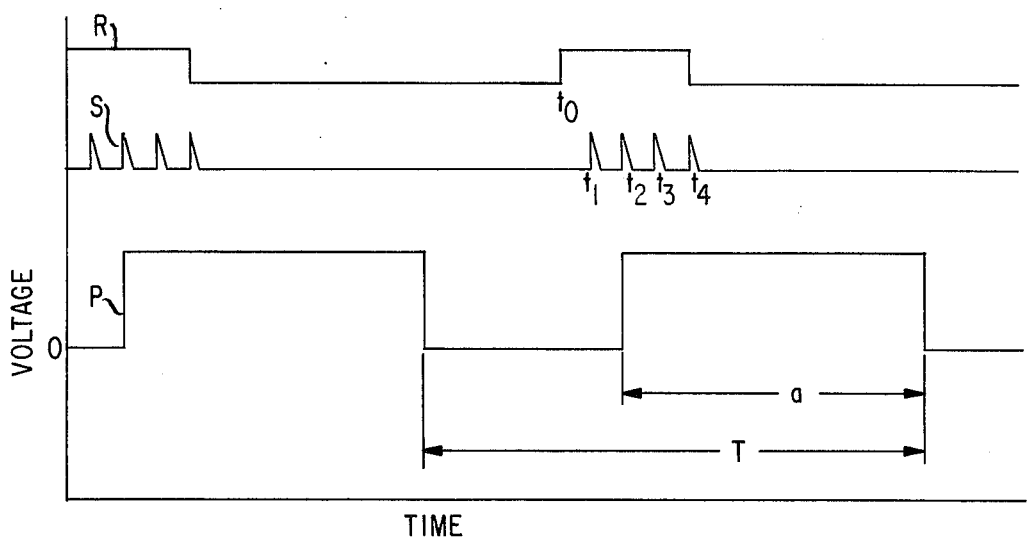
FIG. 6 is a waveform diagram showing the relation of the modulated voltage and the timing signals controlling the digital feedback circuit shown in FIG. 5.

The quiet interval, as can be seen in FIG. 6 occurs while the voltage controlled oscillator 18 is disabled and during the initial conduction interval of the switching device 12. The pulse signal conduction of the switching device 12 is shown by waveform P in FIG. 6.

During the quiet interval which is concurrent with the $t_0$ pulse, the timing signal $t_2$ is applied to lead 25 in order to load into the drive-down counter 19 the count to be decremented when the voltage controlled oscillator 18 is again enabled at the end of the $t_0$ pulse. The overdrive output of the driver-down counter 19 is applied via lead 26 to control the conductivity of the switching device 12. As described hereinabove, the driving signal is applied to maintain the switching device 12 conductive during the interval defined by the time necessary to decrement the count stored in the driver-down counter 19. Once the count has been totally decremented to ZERO, the first count in the negative range changes the signal state on lead 26 and the switching device 12 is biased nonconducting. The count to be decremented is supplied by the differential proportional portion and integral feedback functions described hereinbelow.

The speed of the operation of this digital feedback control is greatly enhanced by transferring the various reference and control numbers from one feedback circuit unit to another in parallel. It can be readily ascertained from the drawing where these parallel transfers occur by observing the thick connecting lines which have been utilized within the drawing to designate the paths of parallel number transfers.

The differential portion of the feedback circuitry includes the differential up counter 31 and the differential down counter 32 and a gain value adjust circuit 54. A timing signal $t_3$ is applied via lead 29 to parallel load into the differential down counter 32 the existing count in the differential up counter 31 generated during the previous switching period. A subsequent timing signal $t_4$ is applied, via lead 35, to clear the existing count from the differential up counter 31. The existing count just loaded into the differential down counter 32 is a count representative of the actual magnitude of the voltage output of the regulator during the preceding cycle of operation of the switching regulator.

As soon as the voltage controlled oscillator 18 is enabled by termination of the signal $t_0$, shown by waveform R in FIG. 6, the voltage controlled oscillator 18 generates a signal frequency. This signal frequency is applied via lead 30 to both the differential up counter 31 and the differential down counter 32. For the duration of conduction of switching device 12, the differential up counter 31 accumulates a count which is representative of the average output voltage of the regulator during the current switching period.

Concurrently the count stored in the differential down counter 32 is decremented by the output signal frequency of the voltage controlled oscillator 18. At the end of the conduction interval of the switching device 12, the count remaining in the differential down counter 32 is a difference count representative of the differential of the output voltage of the regulator. This count is applied in parallel form via lead 34 to a gain value adjust circuit 54 which operates by shifting the binary number representing the count.

This gain value adjust circuit 54 may comprise hardwire wiring or a shift register. Use of binary numbers permits easy control of feedback gain since a mere shifting operation can be used to vary the gain of the digital feedback control signal. The output of this gain value adjust circuit 54 is applied in parallel form via lead 57 to a summing or adder circuit 60.

The proportional feedback section of the feedback circuitry comprises a reference count source 38, a proportional down counter 41, and a gain value adjust circuit 55. Reference count source 38 includes or stores a preset number which is representative of the desired output voltage of the regulator. A timing signal $t_3$, which is shown in waveform S in FIG. 6, is applied to lead 43 of the proportional down counter 41 and operates to load into the proportional down counter 41 the reference count supplied in parallel form thereto via lead 39 by the reference count source 38. At the termination of the quiet interval defined hereinabove, the voltage controlled oscillator 18 is enabled and its signal frequency decrements the count which has been loaded into the proportional down counter 41. The resultant decremented count, representative of the error of the output voltage of the regulator, is supplied in parallel form via lead 42 to a gain value adjust circuit 55 where the gain is adjusted by the shifting operation, as described above. This gain modified proportional feedback value is applied in parallel form via lead 58 to the summing circuit 60.

The integral feedback section operates in conjunction with the proportional feedback section described above. The integral feedback utilizes an integral register 48 into which successive proportional feedback values representative of the error in the output voltage are summed with successively generated integral values. The output of both the proportional down counter 41 and the output of the integral register 48 are applied in parallel form to a summing circuit 47. The timing signal $t_1$, shown by waveform S in FIG. 6, is applied via lead 51, AND gate 49, and lead 52 to activate the integral register 48 to load therein the output of the adding circuit 47. The output of the integral register 48 is applied in parallel form via lead 53 to a gain value adjust circuit 56 and from thence the gain adjusted value is applied in parallel form via lead 59 to the summing circuit 61.

Since the integral register 48 stores cumulative proportional feedback error values, it is apparent that in some instances the resultant number can exceed its storage capacity. Hence, the sign of the output count value generated by the summing circuit 47 is monitored by an overflow control which includes the lead 50 coupling the output sign of summing circuit 47 to an inverting input of AND gate 49. If the integral register 48 becomes overloaded, the sign of the signal output of the summing circuit 47 is different from the common sign of the two input counts. This signal output condition is applied via lead 50 to disable the AND gate 49, and hence prohibits the count being loaded into the integral register 48 by application of the timing signal $t_1$ thereto.

The output of the summing circuit 60 is applied in parallel from via lead 63 to summing circuit 61 and summed therein with the integral feedback signal applied thereto in parallel form via lead 59 and the resulting count is applied in parallel form via lead 62 to the driver-down counter 19. It is loaded into the driver-down counter 19 in response to timing signal $t_2$ applied via lead 25 and becomes the basic count number which controls the conduction interval of the switching device 12 during the subsequent switching cycle of the regulator.

As described hereinabove, the three abovedescribed feedback functions, as combined, significantly improve the performance of the switching regulator with a minimum of component parts. The proportional feedback provides independent gain control and improves both the dynamic and static error response of the circuit by increasing the feedback again. By combining this proportional feedback with the differential feedback described, the dynamic response of the feedback control is significantly improved. The integral feedback is added to improve the proportional and differential feedback and, while by itself it would be unstable, in combination with the proportional and differential feedback signals, they significantly reduce steady state error in the output of the switching regulator.

Figure 7:
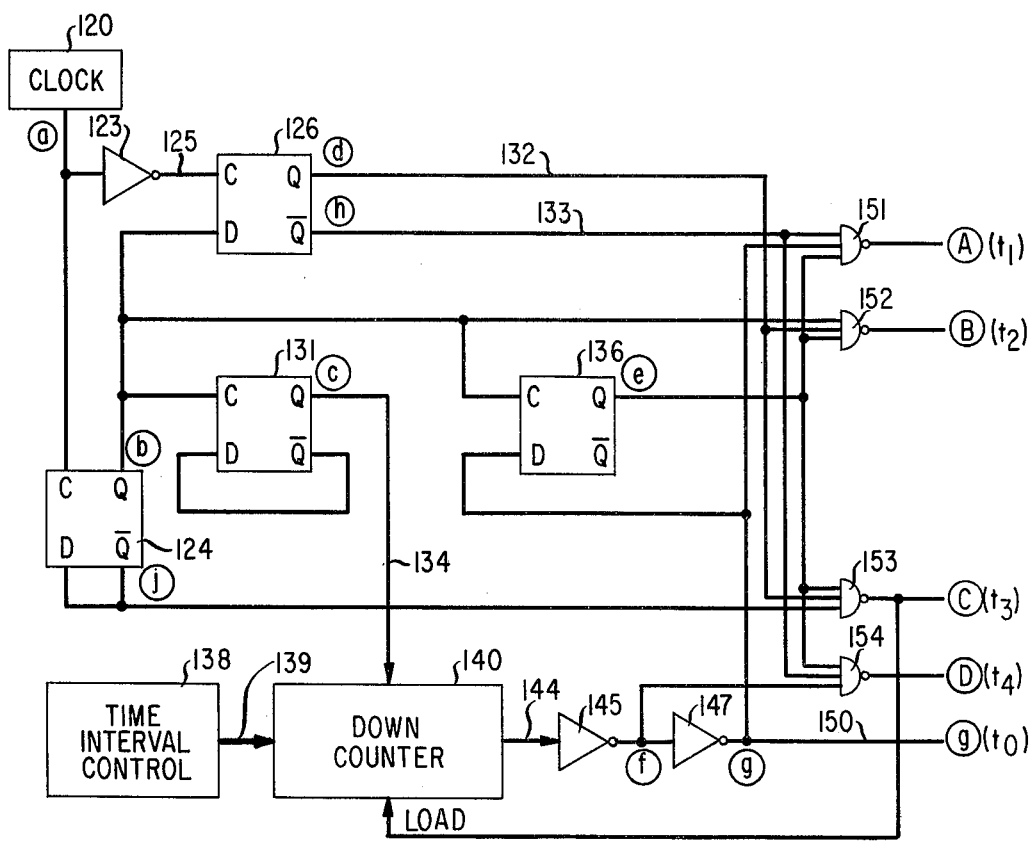
FIG. 7 is a block diagram of a clock circuit to generate the timing pulse signals to control the digital feedback circuit shown in FIG. 5.

A suitable timing circuit to supply the necessary timing signals described hereinabove with reference to the description of the digital feedback control in FIG. 6 is disclosed in block diagram form in FIG. 7. The basic timing signals are generated in response to a high frequency clock source 120 which may comprise a high frequency oscillator or any other high frequency signal source. The output of the clock 120 designated by the reference ⓐ is shown as waveform ⓐ in FIG. 8. It is here noted that the lower case and higher case letters encircled in FIG. 7 designate the points in the timing circuit at which the similarly designated waveforms shown in FIG. 8 occur. The signal frequency shown by waveform ⓐ is applied to NAND gate 123 and to the C input of an edge triggered D-type flip-flop 124.

The edge triggered D-type flip-flop has two basic inputs, a clock input and a data input, shown in the drawing as C and D inputs and two outputs designated Q and complementary Q. The edge triggered D-type flip-flop has an operating characteristic wherein information preset at the D input is transferred to the Q output whenever a clock input changes from a low state to a high state. A natural function of such an edge triggered D-type flip-flop is to operate as a divide-by-two divider or as a memory element. The D-type flip-flops 124, 126 and 131 are utilized as divide-by-two dividers and the D-type flip-flop 136 is utilized as a storage or memory element.

The output of NAND gate 123 is coupled, via lead 125, to the C input of D-type flip-flop 126. The Q and complement Q outputs on leads 132 and 133 are shown by waveforms ⓓ and ⓗ respectively, in FIG. 8. Waveform ⓓ is applied to NAND gates 153 and 152. Waveform h is applied to the NAND gates 151 and 154. The Q output of the D-type flip-flop 124, shown by waveform ⓑ is applied to NAND gate 152 and to the C inputs of the D-type flip-flops 131 and 136. The Q output of D-type flip-flop 136, shown by waveform ⓔ is applied to the NAND gates 151 through 154.

Figure 8:
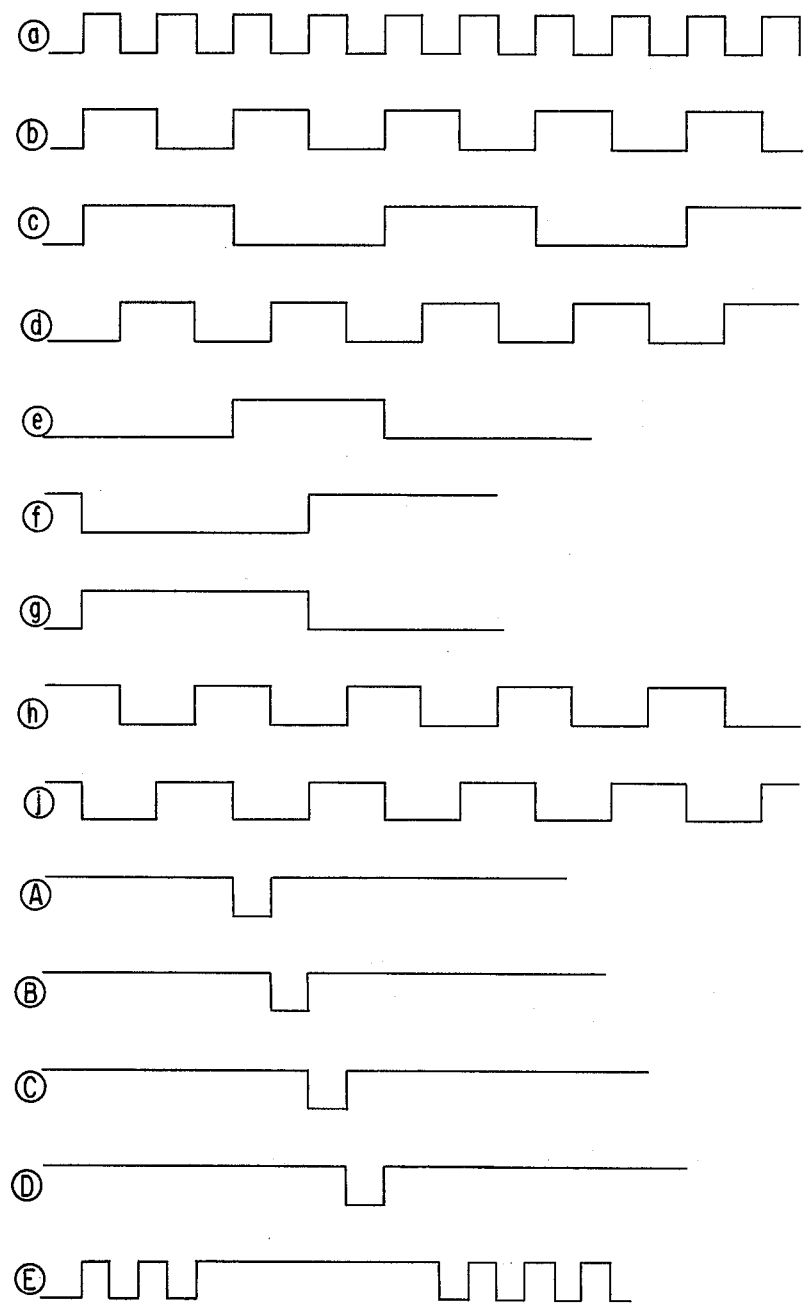
FIG. 8 discloses voltage waveforms of the timing circuit to assist in explaining its operation.

The resulting pulse output (waveform ⓒ of D-type flip-flop 131 is a frequency divided version of the pulse output of clock 120. This waveform ⓒ is applied to decrement a down counter 140 which provides a time interval control of the timing circuit and is used to establish the quiet interval in response to the time interval control 138. The time interval control 138 is a register which stores a predetermined count which is utilized to control or determine the quiet interval duration established by the timing circuit. This count is applied in parallel form via lead 139 to the down counter 140 wherein it is decremented by the signal represented by waveform ⓒ. As long as the preset count exists in the down counter 140, the output on lead 144 has a high state. When the count in the down counter has been completely decremented, the output changes to a low state. This signal is inverted by NAND gate 145 and identified in FIG. 8 by signal waveform ⓕ. This signal is applied to NAND gate 154. The waveform ⓕ is again inverted by NAND gate 147 and becomes the signal designated by waveform ⓖ. Waveform ⓖ is applied as the disabling signal to the disabling input of the voltage controlled oscillator 18 described hereinabove. The output of the voltage controlled oscillator 18 is shown by waveform Ⓔ in FIG. 8. The various outputs of the NAND gates 151, 152, 153, and 154 are shown by the waveforms Ⓐ, Ⓑ, Ⓒ, and Ⓓ in FIG. 8 and are the timing signals $t_1$, $t_2$, $t_3$, and $t_4$, respectively. The output C $t_2$, is also utilized to load the down counter 140. While a particular timing circuit has been shown herein, it is apparent to those skilled in the art that a timing circuit capable of generating the disabling and timing signals shown by the waveforms A, B, C, and D in FIG. 8 is suitable for use in a digitally controlled feedback circuit embodying the principles of the invention described hereinabove.

Many varied and different forms of a digital feedback control will be readily apparent to those skilled in the art upon perusal of the above-described invention which will not depart from the spirit and scope of the invention.

What is claimed is:

1. A digital feedback circuit to control a switching device in a signal regulator circuit comprising:
    a signal magnitude-to-signal frequency converter responsive to an output signal magnitude of said signal regulator;
    a first down counter coupled to drive said switching device and to be decremented by said signal magnitude to signal frequency converter;
    regulation means for generating a count to be loaded into said first down counter comprising:
    a second down counter connected to be decremented by said signal magnitude-to-signal frequency converter;
    a reference count source coupled to said second down counter to supply thereto a reference count;
    a storage register circuit to store counts; p1 a first adder circuit connected to receive outputs from said second down counter and said storage register and having an output connected to an input of said storage register; and a second adder circuit coupled to receive outputs of said storage register and said second down counter and having an output connected to an input of said first down counter.

2. A digital feedback current as defined in claim 1 further including:

an up counter coupled to said signal magnitude-to-signal frequency converter in order to count a signal frequency thereof;

a third down counter coupled to receive an output of said up counter and to be decremented by a signal frequency of said signal magnitude-to-signal frequency converter; and an output of said third down counter being coupled to an input of said first down counter.

3. A digital feedback circuit as defined in claim 1 further including means for controlling storage of counts in said storage register comprising gating means coupling a control signal to said storage register and being disabled in response to a preselected count polarity condition of said first adder circuit.

4. A digital feedback circuit as defined in claim 1 further including timing circuit means to control loading and clearing of counting circuits therein comprising a clock source and dividers responsive thereto to derive sequential timing signals therefrom.

5. A digital feedback control for a switching regulator comprising:

means for driving a switching device in said switching regulator including means for generating a signal frequency responsive to a signal magnitude at an output of said switching regulator;

means for generating a first count representative of a derivative of said signal magnitude at an output of said switching regulator;

means for generating a second count representative of an error of said signal magnitude at an output of said switching regulator from a predetermined desired signal magnitude;

means for generating a third count representative of an integral of the error of said signal magnitude at an output of said switching regulator by summing successive second counts to achieve an accumulated count; and summing said first, second, and third counts to attain a summed count therefrom and decrementing said summed count with said signal frequency to determine a conduction interval of said switching device.

6. A digital feedback control as defined in claim 5 wherein said means for generating a first count comprises a differential up counter coupled to count said signal frequency and a differential down counter coupled to receive a count output of said differential up counter and coupled to be decremented by said signal frequency.

7. A digital feedback control as defined in claim 5 wherein said means for generating a second count comprises a reference count source and a proportional down counter coupled to receive a count from said reference count source and coupled to be decremented by said signal frequency.

8. A digital feedback control as defined in claim 5 wherein said means for generating a third count comprises an adder having an input to receive said second count and a storage register to store counts having an output coupled to an input of said adder and an input coupled to an output of said adder.

9. A digital control circuit to regulate a pulse width modulated power supply comprising:

means for generating a signal frequency proportional to a sensed signal magnitude of said power supply;

a driver-down counter adapted to control a switching device of said power supply and coupled to be decremented by said signal frequency;

feedback means to generate a count to control a conduction interval of said switching device;

said feedback means comprising:

first means for generating a difference count representative of a differential of said sensed signal magnitude;

second means for generating a proportional count representative of an error of said sensed signal magnitude from a desired magnitude;

third means for generating an integral count representative of an integral of an error of said sensed signal magnitude from a desired signal magnitude including means for accumulating successive counts comprising count storage means to store said accumulating successive counts, and summing means to sum said accumulating successive counts with a present proportional count representative of an error of said sensed signal magnitude;

means for summing said difference, proportional, and integral counts; and means for entering said summed count into said driver-down counter, whereby said driver-down counter controls said switching device to be conductive until said summed count is totally decremented by said signal frequency whereupon said switching device is driven nonconductive.

10. A digital control circuit as defined in claim 9 wherein said first means for generating a difference count comprises:

a differential up counter coupled to count said signal frequency and a differential down counter coupled to receive a count output of said differential up counter and coupled to be decremented by said signal frequency.

11. A digital control circuit as defined in claim 9 wherein said second means for generating a proportional count comprises:

a reference count source and a proportional down counter coupled to receive a count from said reference count source and coupled to be decremented by said signal frequency.

12. A digital control circuit as defined in claim 9 wherein said summing means comprises:

an adder having an input to receive said proportional count and said count storage means comprises a storage register to store counts having an output coupled to an input of said adder and an input coupled to an output of said adder.

13. A digital feedback control unit to control the duty cycle of a switching device in a switching voltage regulator to regulate the output voltage comprising:

conversion means coupled to convert a signal output magnitude of the regulator into a signal frequency;

first counting means coupled to the conversion means to generate in each cycle of operation an actual count representative of the signal output magnitude;

second counting means coupled to said first counting means and operative to subtract successive counts occurring in successive cycles of operation to establish a differential feedback count;

a reference count source;

third counting means coupled to said conversion means and said reference count souce and operative to decrement a reference count supplied by said reference count source with the actual count, each cycle of operation to establish a proportional feedback count;

accumulation means coupled to said third counting means and operative to accumulate successive proportional feedback counts during successive cycles of operation to establish an integral feedback count;

summing means coupled to sum said differential, proportional, and integral feedback counts; and fourth counting means coupled to receive the output of said summing means and further coupled to be decremented by the signal frequency output of said conversion means whereby the time interval required to decrement a count to zero in said fourth counter establishes the duty cycle of said switching regulator.

14. A digital feedback control unit as defined in claim 13 wherein said accumulation means comprises:

a count storage register and an adder having two inputs coupled to receive an output from said storage register and to receive a proportional feedback count of said third counting means, respectively.

15. A digital feedback control unit as defined in claim 14 further including means to prevent an overload condition in said storage register by inhibiting a further loading of counts therein.

* * * * *